United States Patent Office 2,944,292
Patented July 12, 1960

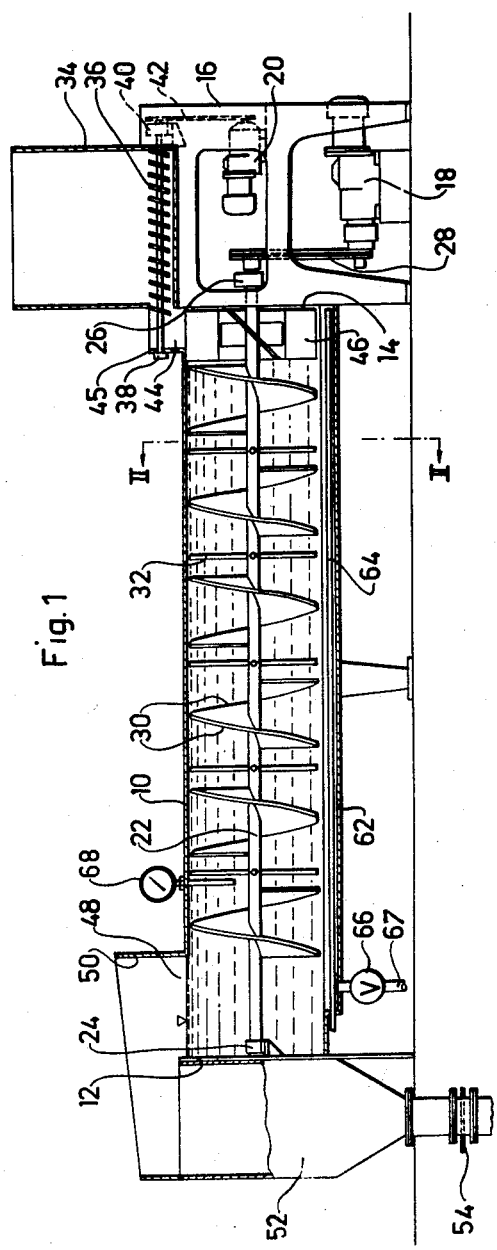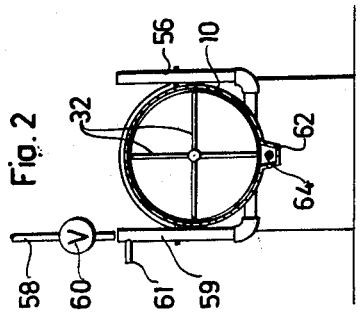

2,944,292

METHOD FOR PRE-EXPANDING EXPANDABLE GRANULES OF A SYNTHETIC THERMOPLASTIC MATERIAL

Lars Sten Robert Norrhede, Alvangen, Sweden, assignor to Isoleringsaktiebolaget WMB, Gothenburg, Sweden, a corporation of Sweden Filed Apr. 4, 1956, Ser. No. 576,051

1 Claim. (Cl. 18—48)

This invention relates to the production of porous bodies from synthetic plastic material. More particularly this invention relates to the production of porous bodies, preferably intended for insulating purposes, said production starting from granules or grains of synthetic thermoplastic material which under influence of heat are blown or expanded into a porous state. As example for such a synthetic material may be mentioned polystyrene to which an expanding agent such as petroleum ether is added. The starting material consists of compact granules which are heated by means of a liquid such as water, at an increased temperature, of 80–100° C., for example, and in this way caused to increase their volume by 50 times and more.

This invention relates in particular to a method forming part of the production of the bodies during which the granules are expanded into the porous state.

One main object of the invention is to provide a process to produce a mass within which the individual granules are expanded substantially uniformly and the final product consequently has a very high homogeneity.

A further object of the invention is to provide a method to expand the granules in a continuous process.

Further objects and advantages of the invention will be apparent from the following description considered in connection with the accompanying drawing which forms part of this specification and of which:

Fig. 1 is a vertical longitudinal section through an apparatus constructed so as to be adapted to carry out the method according to the invention, Fig. 2 being a cross-section following line II—II of Fig. 1.

Referring to the drawing, 10 designates a cylindrical drum, the center line of which is horizontal and the length of which may be several metres. At both ends the drum is closed by end walls 12 and 14, respectively. Located adjacent the end wall 14 is a support 16 carrying two electric motors 18 and 20, respectively, which in a manner known per se are built so as to give the driven shaft an adjustable rotational speed. A shaft 22 extends through the drum and is mounted in two bearings 24 and 26, respectively, of which the former may be carried by the end wall 12 and the latter by the support 16. The shaft 22 is driven by the motor 18 through a chain, a belt transmission or the like 28.

The shaft 22 carries a plurality of blades 30 or the like dimensioned so as to suit to the internal width of the drum and individually wound helically for not more but substantially one turn. The blades are mounted in spaced relation relative to one another, the intermediate space being occupied by members such as four arms 32 forming a cross and having such radial dimension as to reach the cylindrical wall of the drum, and a small axial dimension.

The starting material having the form of small granules is introduced through a charging hopper 34, the base portion of which is provided with a horizontally extending screw conveyor 36 mounted in bearings 38, 40 and rotated by the motor 20 through a power transmission 42. The conveyor advances the granules to an opening 44 located at the end of the drum and constituted by a hopper-shaped superstructure 45 on the top-portion thereof. Located below the opening is a vane-provided wheel 46 mounted on the shaft 22 and adapted to carry the granules downwardly and to feed them in the axial direction to the first of the blades 30. The vane wheel 46 is composed of a plurality of vanes, for example ten vanes having an inclination such as to impart to the granules a relatively high component of motion in the axial direction.

At the opposite end of the drum 10 there is a discharge opening 48 also located in the topmost portion of the drum and laterally bounded by a collar 50. A container 52 disposed within said collar 50 adjacent the discharge opening 48 is provided with a valve 54 through which the expanded mass is drawn off.

The drum is filled with water the level of which is controlled by means of a water gauge 56. The water is supplied through a conduit 58 including a valve 60. The conduit 58 opens into a top-open tube 59 connected to the lower part of the drum and provided with an overflow 61 ensuring maintenance of the predetermined water level in the drum. Along its lowest part the drum has a channel like recess 62 housing a perforated tube 64 through which steam is introduced into the water in the drum in order to adjust its temperature to the predetermined value such as 80–100° C. The water content of the drum can be drained off through a conduit 67 provided with a valve 66. The temperature of the water can be ascertained on a thermometer 68.

The apparatus operates in the following manner:

The grains or granules advanced by the conveyor 36 towards the opening 44 are brought into contact with the water in the drum while rapidly being conveyed by the vane wheel 46 away from the feeding zone. This feature is of importance as said zone otherwise would be exposed to a clogging by the granules which when coming into contact with the hot water begin to expand. By the blades 30 the granules are advanced during the expansion process in an axial direction towards the discharge opening, an agitation in the water taking place simultaneously. The members 32 have for their purpose to disintegrate agglomerations of expanding granules which is particularly important as the granules to the largest possible extent should come into contact with the water. Expanding granules could clog around other granules preventing them from coming into contact with the water and cause them to remain more or less undeveloped as a consequence. The period for the expansion in the hot water bath can be varied by adjusting the motor 18 and lasts generally for several minutes. Due to the combined axial feed under agitation and the disintegrating effect of the members 32 the expanded mass becomes highly homogeneous when leaving the drum through the discharge opening 48 and by own action welling over into the container 52. The granules may initially have a specific weight slightly surpassing that of water, said weight being reduced successively during the expansion process, for which reason the expanded mass floats up above the surface of the water content of the drum in the discharge opening 48 and in this way automatically separates from the water bath. The continuous increase in volume of the granular mass results in that said mass after occupying behind the vane wheel 46 a part only of the cross-section of the drum, successively fills up more and more of said section. The mass after discharge from the container 52 is subjected to a drying operation preceding the sizing or agglutinating of the expanded granules into bodies of desired shape.

While one more or less specific embodiment of the

What I claim is:

The method of expanding granules of a synthetic thermoplastic material which comprises maintaining a confined body of liquid at an elevated temperature which is sufficiently high so as to render the thermoplastic material sufficiently soft for expansion, said liquid body comprising a plurality of successive zones, the first of which is a feeding zone, the final one a discharge zone, and an intermediate zone through which the granules have a horizontal progression, continually feeding to said feeding zone granules of the synthetic thermoplastic material having a specific gravity about the same as that of the liquid, dispersing said granules and imparting thereto a forward progression into said intermediate zone, agitating said granules and disintegrating agglomerations thereof while progressing forwardly through said intermediate zone for retarding the rate of progression and the time of transit to determine the degree of expansion and reduction of the specific gravity of the expanded granules and to cause them to float to the liquid surface upon reaching the discharge zone.

References Cited in the file of this patent

UNITED STATES PATENTS

| | | |
|---|---|---|
| 675,163 | Overton | May 28, 1901 |
| 812,849 | Jaquet | Feb. 20, 1906 |
| 963,122 | Damon | July 5, 1910 |
| 970,240 | Kilborn | Sept. 13, 1910 |
| 2,021,837 | Davidson | Nov. 19, 1935 |
| 2,213,056 | Skoog et al. | Aug. 27, 1940 |
| 2,525,966 | Smith et al. | Oct. 17, 1950 |
| 2,531,665 | Booth | Nov. 28, 1950 |
| 2,567,952 | Lewis | Sept. 18, 1951 |
| 2,626,856 | Alles | Jan. 27, 1953 |
| 2,664,406 | Armstrong | Dec. 29, 1953 |
| 2,673,723 | Keen | Mar. 30, 1954 |
| 2,689,374 | Toulmin, Jr. | Sept. 21, 1954 |
| 2,787,809 | Stastny | Apr. 9, 1957 |

FOREIGN PATENTS

| | | |
|---|---|---|
| 650,023 | Germany | Sept. 9, 1937 |

OTHER REFERENCES

Boundy et al.: "Styrene its Polymers, Copolymers and Derivatives," Monograph Series No. 115, 1952, pub. by Reinhold Publishing Co., pages 475, 566, and 1240 (Copy in S. Lib. and Div. 15.)